United States Patent
Li

(10) Patent No.: US 8,542,580 B2
(45) Date of Patent: Sep. 24, 2013

(54) METHOD AND SYSTEM FOR TRANSPORTING SERVICE FLOW SECURELY IN AN IP NETWORK

(75) Inventor: Hejun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1249 days.

(21) Appl. No.: 11/543,790

(22) Filed: Oct. 6, 2006

(65) Prior Publication Data

US 2007/0086340 A1    Apr. 19, 2007

Related U.S. Application Data

(63) Continuation of application No. PCT/CN2005/000873, filed on Jun. 17, 2005.

(30) Foreign Application Priority Data

Jun. 18, 2004    (CN) .......................... 2004 1 0049176

(51) Int. Cl.
  *G01R 31/08*    (2006.01)
  *H04L 12/66*    (2006.01)
  *H04L 12/28*    (2006.01)

(52) U.S. Cl.
  USPC ............................ 370/230; 370/352; 370/389

(58) Field of Classification Search
  USPC .............. 370/229, 230, 235, 236, 236.1, 237, 370/241–255
  See application file for complete search history.

(56) References Cited

U.S. PATENT DOCUMENTS

| | | | | |
|---|---|---|---|---|
| 5,684,954 A | * | 11/1997 | Kaiserswerth et al. | 709/236 |
| 6,181,692 B1 | * | 1/2001 | DeGolia, Jr. | 370/352 |
| 6,760,306 B1 | * | 7/2004 | Pan et al. | 370/230 |

(Continued)

FOREIGN PATENT DOCUMENTS

| | | |
|---|---|---|
| CN | 1353526 A | 6/2002 |
| CN | 1479494 A | 3/2004 |

(Continued)

OTHER PUBLICATIONS

Moon B. et al.: "Diffserv Extensions for QOS Provisioning in IP Mobility Environments", IEEE, Wireless Communications, IEEE Service Center, Piscataway, NJ, US, vol. 10, No. 5, Oct. 2003, pp. 38-44, XP001186105 ISSN: 1536-1284, p. 39, left-hand column, line 50-right-hand column, line 10.

(Continued)

*Primary Examiner* — Brandon Renner
(74) *Attorney, Agent, or Firm* — Slater & Matsil, L.L.P.

(57) ABSTRACT

The present invention provides a method for transporting a service flow securely in an Internet Protocol (IP) network, which includes the following steps: a service server sends a first request to a resource manager, requesting to build a service flow path between a calling user and a called user in a logical bearing network; the resource manager chooses a service flow path between a first Provider Edge Router (PE) that the calling user belongs to and a second PE that the called user belongs to in the logical bearing network; the resource manage sends a configuration request message to the first and second PEs; the first and second PEs build flow classification table items including the service flow path according to the configuration request message, respectively, and forward only the service flow matching one of the flow classification table items to corresponding service flow path in the logical bearing network.

12 Claims, 2 Drawing Sheets

(56) References Cited

U.S. PATENT DOCUMENTS

| | | | |
|---|---|---|---|
| 6,826,173 B1* | 11/2004 | Kung et al. | 370/352 |
| 7,068,635 B2 | 6/2006 | Dempo | |
| 7,319,691 B2* | 1/2008 | Qing et al. | 370/351 |
| 2001/0017723 A1* | 8/2001 | Chang et al. | 359/128 |
| 2004/0177107 A1* | 9/2004 | Qing et al. | 709/200 |
| 2004/0213224 A1* | 10/2004 | Goudreau | 370/389 |
| 2005/0021713 A1* | 1/2005 | Dugan et al. | 709/223 |
| 2005/0195741 A1* | 9/2005 | Doshi et al. | 370/230 |
| 2006/0203776 A1* | 9/2006 | Persaud et al. | 370/331 |

FOREIGN PATENT DOCUMENTS

| | | |
|---|---|---|
| CN | 1283079 C | 11/2006 |
| EP | 1 206 098 A | 5/2002 |
| JP | 2002-208946 | 7/2002 |
| WO | WO 02/39770 A1 | 5/2002 |

OTHER PUBLICATIONS

Communication pursuant to Article 94(3) EPC, Application No. 05 759 478.0-1244, Applicant: Huawei Technologies Co., Ltd., Feb. 12, 2008, 6 pages.

Communication pursuant to Article 94(3) EPC, Application No. 05 759 478.0-1244, Applicant: Huawei Technologies Co., Ltd., Jul. 16, 2008, 5 pages.

Written Opinion of the International Searching Authority, International Application No. PCT/CN2005/000873, Applicant: Huawei Technologies Co., Ltd., Mailing Date: Sep. 29, 2005, 3 pages.

Chinese Office Action with English Translation, Application No. 2004100491762, Mailing Date: Sep. 26, 2008, 7 pages.

* cited by examiner

METHOD AND SYSTEM FOR TRANSPORTING SERVICE FLOW SECURELY IN AN IP NETWORK

CROSS-REFERENCE TO RELATED APPLICATIONS

This is a continuation of International Application No. PCT/CN2005/000873, filed on Jun. 17, 2005, now published as WO 2005/125104, published date Dec. 29, 2005, which designated the United States; which claims priority of Chinese Patent Application No. 200410049176.2, filed Jun. 18, 2004, the disclosure of each application is hereby incorporated by reference in their entirety.

FIELD OF THE TECHNOLOGY

This invention relates to the technique of network security, and more particularly, to a method and system for transporting service flow securely in an IP network.

BACKGROUND OF THE INVENTION

The practical application of the technique of Internet Protocol (IP) network has become more and more popular with its ceaseless development. The IP network has gradually started to bear services with the quality of service and security requirement of telecommunication level. Therefore, the security of the IP network has attracted more and more attention.

It is known to all that the IP network is a network without the guarantee for security. Such insecurity is due to the adoption of a connectionless oriented architecture of the IP network. An end-to-end communication using a connection oriented manner can not be implemented until an end-to-end connection is built by signaling and network physical or logical resources are allocated. In contrast, an end-to-end communication service using the connectionless oriented manner is performed directly without the need of building a connection by signaling. The key of the security of an end-to-end communication service of telecommunication level is to build a trust relationship between the ends. Such a trust relationship in the connection oriented manner is confirmed when the connection is built while the trust relationship in the connectionless oriented manner is confirmed during the communication.

Multi-protocol Label Switching (MPLS) is a protocol proposed originally for enhancing forwarding speed of routers. The key point of the MPLS protocol is to introduce a label into the field, which just indicates local meaning without any topology information. The label is short so as to be easy to deal with and it can usually be quoted directly with an index. The label has only a local meaning such that it is convenient to be assigned. The MPLS has become an important standard for extending the scale of the IP network increasingly because it has been used in two key techniques in the IP network, i.e., traffic engineering and virtual private network.

The security of the services of telecommunication level cannot be well guaranteed in the present IP network because ordinary services with low demand for security (mainly including Internet services such as web browsing and ordinary query) and services with high demand for security (mainly including the services of telecommunication level such as the services of video on demand and voice etc) are mixed together without effective partition. To sum up, such insecurity mainly lies in that untrustworthy users cannot be prevented from accessing the network bearing the services of telecommunication level because all the services use the same IP network as a bearer, accordingly it is difficult to resist the vicious attack initiated by untrustworthy users.

Separating the ordinary Internet services from the services of telecommunication level is a key technique for building an IP network with guarantee for security. There are several ways of separating the ordinary services from the services of telecommunication level in the IP network in the prior art.

The first is a separation on the physical layer, with which the ordinary Internet services and the services of telecommunication level use different physical media as bearers, respectively. Though services of different levels can be separated well in this manner, the use of physical layer separation is greatly confined and not flexible. Furthermore, it is not practical to divide the IP network on two different physical media.

The second is a separation on the link layer. For example, the services are separated by using the techniques of a Virtual Local Area Network (VLAN), a Permanent Virtual Circuit (PVC) or a Layer 2 Tunneling Protocol (L2TP) etc. Separation can be achieved in the link layer, which is more flexible than the separation in the physical layer. The technique of the VLAN is the most popular separation technique at present, which makes the ordinary Internet services and the services of telecommunication level belong to different VLANs, such that logical separation in the link layer can be achieved. But this technique is usually limited to the application in a Layer 2 access network close to users.

The third is a separation on the network layer, with which the technique of strategic router or the technique of application layer gateway are used to implement separation of the services of different levels. Different services are differentiated according to information of the third or upper layers by using these techniques, and logical separation and distribution of different information flows are performed by means of an access control list, achieving the objective of separating the services. Though this method is more flexible, it still adopts the connectionless oriented manner.

When using the above methods in practice, illegal users cannot be effectively prevented from accessing the logical bearer network for the services of telecommunication level, therefore the security of the services of telecommunication level cannot be guaranteed.

SUMMARY OF THE INVENTION

A method and system for transporting a service flow securely in an Internet Protocol (IP) network, so as to provide a more effective solution for a secured bearer of the services of telecommunication level in the IP network which is easy to be attacked.

A method for transporting a service flow securely in an Internet Protocol (IP) network, includes the following steps:

a service server sends a first request to a resource manager, requesting to build a service flow path between a calling user and a called user in a logical bearing network;

the resource manager receives the first request, chooses in the logical bearing network a service flow path between a first Provider Edge Router (PE) that the calling user belongs to and a second PE that the called user belongs to;

the resource manager sends a configuration request message to the first PE and the second PE according to the service flow path;

the first PE and the second PE build flow classification table items including the service flow path according to the configuration request message, respectively, and forward only the service flow matching one of the flow classification table items to the corresponding service flow path in the logical bearing network.

A system for transporting a service flow securely in an Internet Protocol (IP) network, includes: a service server, a resource manager, and a logical bearing network includes a Provider Edge Router (PE), the service server is used for processing a received service call, and based on the result of the processing, requests the resource manager to build a service flow path between the calling user and the called user in the logical bearing network;

the resource manager is used for choosing in the logical bearing network a service flow path between the PE that the calling user belongs to and the PE that the called user belongs to according to the request from the service server, and sends a configuration request message to each of the above two PEs according to the service flow path;

the logical bearing network, which includes routers in the IP network and label switching paths that connect the routers, is used as a bearer of the service flow;

the PE is used for building flow classification table items according to the received configuration request message, and forwarding the service flow matching one of the flow classification table items in the logical bearing network. The difference between the method of the present invention and that in the prior art lies in that a dedicated logical service channel can be built between the calling and the called of a service of telecommunication level with demand for security guarantee by the logical separation of the services and the connection oriented technique. Specifically, a connection oriented transporting path is built through a series of message interaction for the service of telecommunication level with demand for security guarantee before the service is transported in the IP network. Furthermore, the service flow is dispatched according to the flow classification table items to the corresponding logical bearing network for transportation when the service flow reaches a PE, and the service flow which has no corresponding table items in the flow classification table is forwarded as an ordinary Internet service.

To sum up, logical separation and classified transportation of the service flows are achieved in the present invention, which may provide reliable and dedicated Label Switching Path (LSP) for different service flows. Therefore, the security of the services of telecommunication level being transported in the IP network may be guaranteed and vicious attacks may be prevented effectively.

DETAILED DESCRIPTION OF THE INVENTION

In order to make the objects, technical solutions and advantages of the present invention more apparent, the present invention is hereinafter described in detail with reference to the embodiments and the accompanying drawings.

Figure 1:
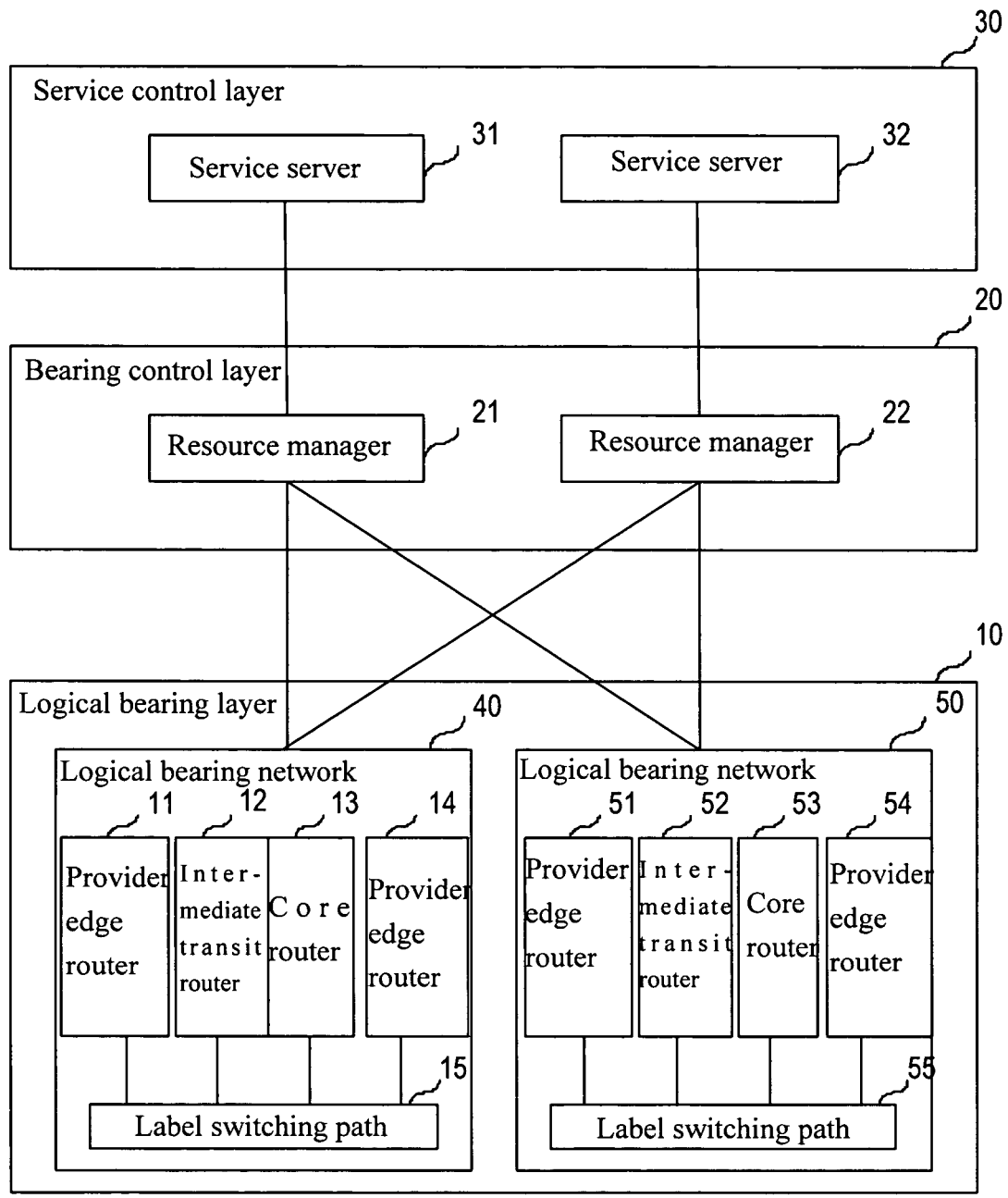
FIG. 1 is a diagram illustrating the logic structure of the system for guaranteeing the security in an IP network in accordance with an embodiment of the present invention.

As shown in FIG. 1, the logic structure of the system for guaranteeing the security in the IP network is divided from the bottom up into a logical bearing layer 10, a bearing control layer 20 and a service control layer 30.

In the present embodiment, the logical bearing layer 10 includes logical bearing networks 40 and 50. The logical bearing network can be a network based on Internet Protocol Version 4 (IPv4) or Internet Protocol Version 6 (IPv6). The logical bearing networks 40 and 50, which are planned and configured in advance by using the technique of MPLS label switched path in the physical IP network of the operator, are used to bear IP service packets of particular service types or of particular levels of security (such as voice service, video service and etc.). Different LSPs are configured to bear the IP service packets of different service types or of different levels of security.

The logical bearing networks 40 and 50 correspond to service types of different levels of security, respectively. Refer to such service types as (Expedite Forwarding) EF, (Assured Forwarding) 1 AF1, and AF2 prescribed in the Diff-Serv standard of Quality of Service (QoS) for the definition of security level. The higher the quality of service is, the higher the level of security is. For convenience, a uniform level of security may be adopted. Each of the services is logically separated from other services and the services are logically separated from ordinary Internet services as well. The ordinary Internet services which are not in the logical bearing network cannot get the guarantee for security. It should be noted that the logical bearing networks can share one or more physical devices although each logical bearing network is fully independent logically. The logical bearing network 40 includes Provider Edge Router (PE) 11 and PE 14, intermediate transit router 12, core router 13 and LSP 15 that connects the routers. Suppose that PE 11 is an ingress router, PE 14 is an egress router, a label with fixed length is added to each IP packet which reaches PE 11 by the MPLS. Then, intermediate transit router 12 and core router 13 perform label switching according to the label in the packet head, and perform local forwarding. The IP packets are restored to the original ones when transmitted to PE 14. LSP 15 is formed by the operations of label switching and decisions for transmitting from the ingress to the egress. Then the LSP 15 is built between the ingress and egress by the operations of label switching and forwarding. In the embodiment of the present invention, besides completing the ordinary functions of MPLS label adding and deleting, PE 11 and PE 14 also build a flow classification table according to the configuration request sent by a Resource Manager (RM) and transmit only the service flows that conform with the table items in the corresponding logical bearing networks.

In the present embodiment, bearing control layer 20 includes RM 21 and 22. RM is in charge of managing the network resources (including bandwidth, processor and buffer etc) in logical bearing network 10, and performing the resource permitting control, resource allocating and path choosing for the service application of each service flow to satisfy the demands for security and QoS of the service flow. After RM 21 receives the request sent from service server 31, it chooses the LSP 15 for service flow between PE 11 that the calling user belongs to and PE 14 that the called user belongs to in logical bearing network 40, and sends a configuration request message to PE 11 and PE 14 according to LSP 15.

In the present embodiment, service control layer 30 includes service server 31 and 32. The service server is used to process a service call request sent from a calling user, then request RM 21 or RM 22 according to the processing result to build the LSP for the service flow between the calling user and the called user in the logical bearing network. Common service servers include the soft-switch dealing with call signaling of such real-time communications as Voice over IP (VoIP) and video phone, Video on Demand (VoD) server, and etc.

It should be noted that the physical entities and the connection relations in FIG. 1 can be added, deleted or changed according to the configuration of the network and the demands of the services.

Figure 2:
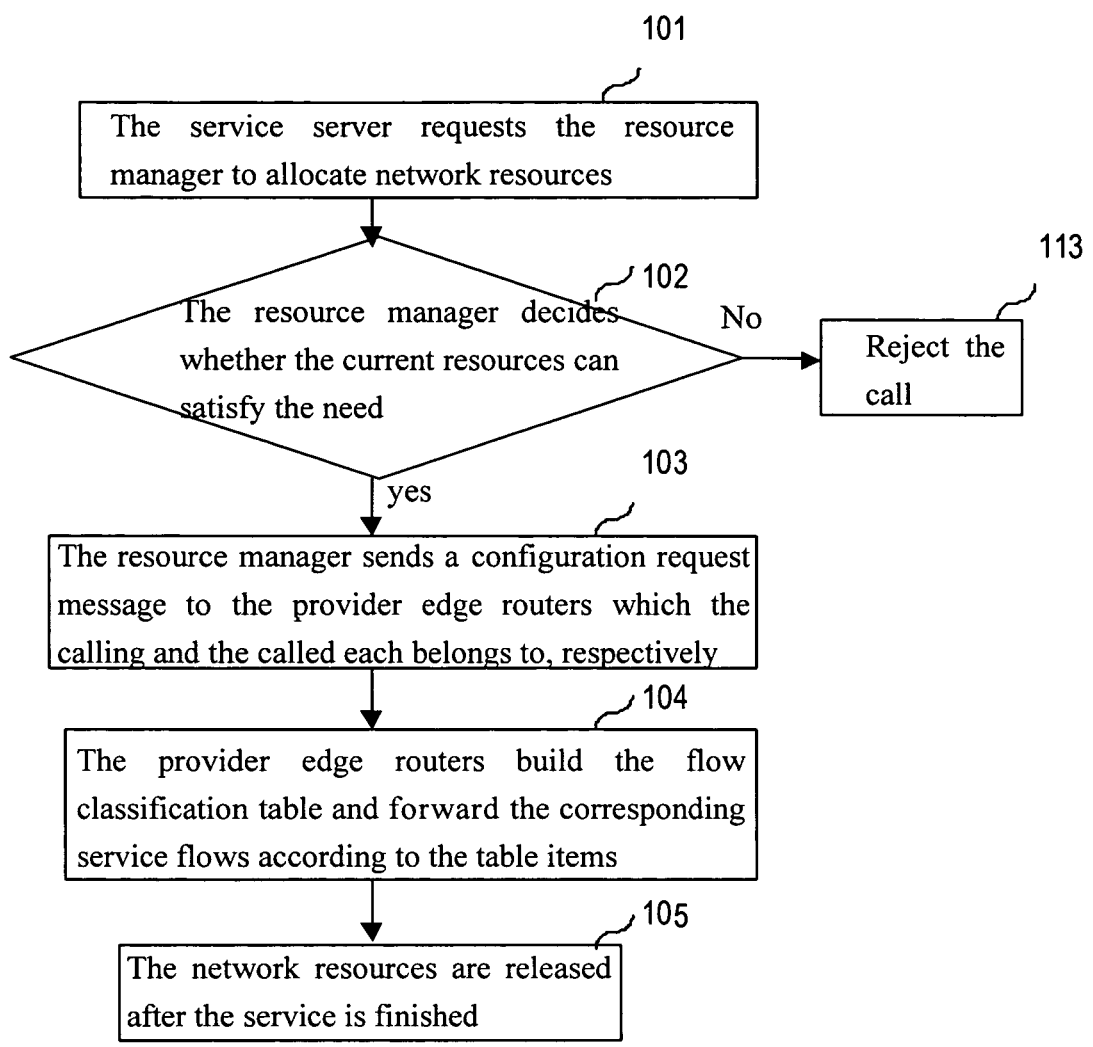
FIG. 2 is a flow chart of the method for guaranteeing the security in an IP network in accordance with an embodiment of the present invention.

The method for transporting a service in the IP network in accordance with the embodiment of the present invention, which aims to provide a secure bearer for the services of telecommunication level in the IP network, is hereinafter further described with reference to FIG. 2. As shown in FIG. 2, the method for transporting a service in the IP network in accordance with the embodiment of the present invention includes the following steps.

Step 101: Service server 31, after receiving a service call request sent from a calling user, sends a request to RM 21 in order to build the LSP 15 for the service flow between the calling user and the called user in logical bearing network 40.

It should be noted that, in a soft-switch architecture, the service server is an entity belonging to the application layer, which is in charge of dealing with related logics of the service rather than in charge of bearing control and transmission. The request message which is sent to RM 21 by service server 31 includes the bandwidth that the call needs, the location information of the calling user and the called user, the level of QoS, the level of security, which are used by RM 21 to decide whether logical bearing network 40 has enough resources to be allocated to the call. For example, RM 21 saves the status of resource occupation of logical bearing network 40, such as the utility ratio of the network bandwidth, the busy/idle states of various routers in the network, etc. By comparing the saved information of the status with the request message sent from service server 31, RM 21 can decide whether logical bearing network 40 has enough resources to be allocated to the call. If the current utility ratio of the bandwidth is very high, it is possible that there are not enough resources to be allocated to a new call. The information can be acquired by the following steps: After service server 31 receives a service call request, first it gets the address information of the calling user and the called user in the request. Then, service server 31 communicates with the calling user and the called user according to the information of the calling user and the called user to get such related information as the bandwidth that the call needs through negotiation. Next, service server 31 analyzes the service request to get the QoS level and the security level.

Step 102: After RM 21 receives a request sent form service server 31, RM 21 decides whether logical bearing network 40 has enough resources to build the LSP 15 for the service flow according to the bandwidth of the call and the addresses of the calling user and the called user in the request. If there are not enough resources, proceed to Step 113, in which the calling user is informed of the rejection to the service call request. If there are enough resources, one LSP satisfying the requirements will be chosen as the bearer path of the call, at the same time the resource status of the logical bearer network will be updated, and a confirmation message will be returned to the service server 31, then proceed to Step 103.

Step 103: RM 21 sends to PE 11 that the calling belongs to and PE 14 that the called belongs to a configuration request which includes the parameters of the service flow, the parameter of the level of security, the parameter of QoS and the route information, requesting PE 11 and PE 14 to configure the flow classification table according to the parameters in the request message. The parameters of the service flow are the parameters that describe the service flow which uses the LSP chosen in Step 102: as a bearer, and they may include the bandwidth that the service flow needs, time delay and jitter; the route information is determined by RM 21 according to the resource status of logical bearing network 40 in Step 102.

Step 104: PE 11 and PE 14 build the flow classification table according to the configuration request sent from RM 21.

The flow classification table can include the attributes of the IP packets, and the serial numbers of LSPs. The attributes of the IP packets includes the protocol, source address, local port number, remote address and/or remote port number. Different LSP serial numbers correspond to different demands of particular service flows such as different bandwidths of different LSPs and different levels of security. PE configures the qualified attributes of IP packet to the corresponding LSP according to the attributes of different LSPs. A flow classification table is shown below. The LSP serial number is the serial number of the LSP to which the IP packets matching a record should be forwarded. For example, the contents of serial number 1 of the table means the IP packet matching the record of table 1 should be transmitted to LSP 5, which is an LSP between PE 11 and PE 14 built with the method in Step 102 satisfying the demands for the corresponding bandwidth and the corresponding level of security.

| Flow classification table | | | | | | |
|---|---|---|---|---|---|---|
| Table Serial no. | local address | local port number | remote address | remote port number | protocol | LSP serial no. |
| 1 | 202.88.88.88 | 16 | 202.66.66.66 | 24 | 20 | 5 |
| 2 | ... | ... | ... | ... | ... | ... |
| 3 | ... | ... | ... | ... | ... | ... |

After the flow classification table is built, the service flow which enters PE 11 and PE 14 can be classified according to the table items. The service flows matching the table items are transmitted to the corresponding logical bearing network 40 and the service flows which are not in the table items are dealt with as ordinary Internet service flows. Specifically, IP 5-tuple (protocol, source address, local port number, remote address and remote port number) in the coming IP packets is compared with the records of the table. If they match each other, add the MPLS label to the packets, then transmit the packets to the corresponding LSP. It should be noted that the flow classification table is a local table confined to each interface board, which performs a service flow classification according to the IP 5-tuple. The flow classification table is dynamically and strictly controlled by RM 21, i.e., strictly controlled by service server 31. If a user has not requested a service to a service platform of the network, there are no corresponding flow classification table items in PE 11 and PE 14. Furthermore, the flow classification table should be updated in real time when an LSP for a service flow is built or deleted. Thus untrustworthy users are prevented form accessing the logical bearing network of services of telecommunication level.

When the service is finished, proceed to Step 105: service server 31 sends a service ending notice to RM 21, then RM 21 updates the resource status of logical bearing network 40 in real time and sends a command to instruct PE 11 and PE 14 to cancel the information of the service flow through updating the flow classification table.

Through the above steps, it is not difficult to find that before a service of telecommunication level with a demand for security guarantee is transported in an IP network, a connection oriented transporting path is built for service through a series of message interaction; and during the transportation, each type of services of telecommunication level is transported in the logical bearing network built for the services, therefore the IP-layer logical separation of the services is achieved.

Though the present invention has been illustrated and described by referring to some preferred embodiments thereof, a person skilled in the art should understand that various changes can be made in form and detail without departing from the spirit or scope of the present invention as defined in the appended claims.

What is claimed is:

1. A method for transporting a service flow securely in an Internet Protocol, IP, network, comprising the following steps:

upon receiving a service call request sent by a calling user, a service server determining bandwidth that the service call needs through negotiation with the calling user and a called user, and analyzing the service call to determine a quality of service (QoS) level and a security level;

the service server sending a first request to a resource manager, requesting to build a service flow path for a call between the calling user and the called user, wherein the first request comprises bandwidth that the service call needs, location information of the calling user and the called user, information of level of QoS and security level;

the resource manager receiving the first request, determining whether the network has enough resources for the service flow path by comparing a current resource status of the network with the information in the first request, if the network has not enough resources for the service flow path, rejecting the first request, and if the network has enough resources for the service flow path, establishing a Label Switching Path (LSP) between a first Provider Edge Router (PE) that serves the calling user and a second PE that serves the called user;

the resource manager sending a configuration request message to the first PE and the second PE respectively according to the LSP;

each of the first PE and the second PE building an item in respective flow classification tables according to the configuration request message, wherein the item comprises correspondence between information of a service flow of the call and an identity of the LSP, the information of the service flow of the call comprises protocol, source address, local port number, remote address, and remote port number; and each of the first PE and the second PE receiving a service flow, determining whether the service flow matches information contained in one of the items listed in the flow classification tables, forwarding the service flow to an LSP corresponding to the service flow when the service flow matches information contained in one of the items listed in the flow classification tables, and forwarding the service flow in a connectionless manner when the service flow does not match information contained in any one of the items listed in the flow classification tables.

2. The method according to claim 1, wherein the configuration request message sent by the resource manager to the first PE and the second PE comprises:

a parameter of the service flow, a parameter of a security level, a parameter of a QoS and routing information, which are used for the first PE and the second PE to build the flow classification tables according to the parameters and the routing information.

3. The method according to claim 1, wherein the flow classification tables built by the first PE and the second PE comprises:

an attribute of an IP packet and an identity of a corresponding service flow path;

the attribute of the IP packet comprises at least one of the following: a protocol, a source address, a local port number, a remote address, and a remote port number; the service flow matching information contained in one of items listed in the flow classification tables is the service flow matching the attribute of the IP packet.

4. The method according to claim 1, further comprising:

the service server sending a service ending notice to the resource manager when a service between the calling user and the called user is over;

the resource manager updating a resource status of the network upon receiving the service ending notice, and sending a command instructing the first PE and the second PE to cancel the service flow in the flow classification tables.

5. The method according to claim 1, wherein the service server is a soft-switching device.

6. The method according to claim 1, wherein the service flow path is a label switching path.

7. The method according to claim 1, wherein the step of the resource manager establishing a service flow path between a first PE and a second PE comprises:

choosing, by the resource manager, from a plurality of pre-established LSPs in an IP network, an LSP between the first PE and the second PE for the call.

8. The method according to claim 7, wherein the step of choosing an LSP between a first PE and a second PE from the pre-established LSPs for the call comprises choosing an LSP which satisfies the demands in the first request from the pre-established LSPs.

9. The method according to claim 8, further comprising:

before the step of sending the first request by the service server, upon receiving a service call request sent by the calling user, the service server determining the bandwidth that the service call needs through negotiation with the calling user and the called user; and analyzing the service call to determine the QoS level and the security level.

10. A system for transporting a service flow securely in an Internet Protocol, IP, network, comprising:

a service server, a resource manager, a first Provider Edge Router (PE) and a second PE, wherein the service server is used for determining bandwidth that a service call needs through negotiation with a calling user and a called user upon receiving the service call request sent by the calling user, and analyzing the service call to determine a quality of service (QoS) level and a security level, sending a first request to the resource manager to build a service flow path for a call between a calling user and a called user, wherein the first request comprises bandwidth that the service call needs, location information of the calling user and the called user, information of level of QoS and security level;

the resource manager is used for receiving the first request from the service server, determining whether the network has enough resources for the service flow path by comparing a current resource status of the network with the information in the first request, if the network has not enough resources for the service flow path, rejecting the first request, if the network has enough resources for the service flow path, establishing a Label Switching Path (LSP) between the first PE that serves the calling user and the second PE that serves the called user, and sending a configuration request message to the first PE and the second PE respectively according to the LSP;

the first PE and the second PE are used for respectively building an item in respective flow classification tables according to the received configuration request message, and after receiving a service flow, determining whether the service flow matches information contained in one of the items listed in the flow classification tables, forwarding the service flow to an LSP corresponding to the service flow when the service flow matches information contained in one of the items listed in the flow classification tables, and forwarding the service flow in a connectionless manner when the service flow does not match information contained in any one of the items listed in the flow classification tables, wherein the item comprises correspondence between information of a service flow of the call and an identity of the LSP, the information of the service flow comprises protocol, source address, local port number, remote address, and remote port number.

11. The system according to claim 10, wherein the establishing a LSP between the first PE and the second PE comprises choosing from a plurality of pre-established LSPs in an IP network, an LSP between the first PE and the second PE for the call.

12. The system according to claim 11, wherein the establishing a LSP between the first PE and the second PE comprises choosing from the plurality of pre-established LSPs an LSP between the first PE and the second PE which satisfies the demands in the first request.

* * * * *